(No Model.)

M. S. PECK.
VELOCIPEDE.

No. 304,023. Patented Aug. 26, 1884.

Witnesses

Inventor
Mason S. Peck

UNITED STATES PATENT OFFICE.

MASON S. PECK, OF PAWTUCKET, RHODE ISLAND.

VELOCIPEDE.

SPECIFICATION forming part of Letters Patent No. 304,023, dated August 26, 1884.

Application filed April 28, 1884. (No model.)

*To all whom it may concern:*

Be it known that I, MASON S. PECK, a citizen of the United States, residing at Pawtucket, in the county of Providence and State of Rhode Island, have invented a new and useful vehicle to be propelled by the rider, which, because of the ten circles which it contains, I have named a "Decacycle." Of said decacycle the following is a specification.

My said invention relates to a vehicle to be propelled by the rider; and it consists of two spring-wheels of peculiar construction, and connected by an intermediate carriage containing the devices for their propulsion.

The accompanying drawings are hereby made part of this specification, similar letters of reference thereon indicating corresponding parts.

Figure 1:
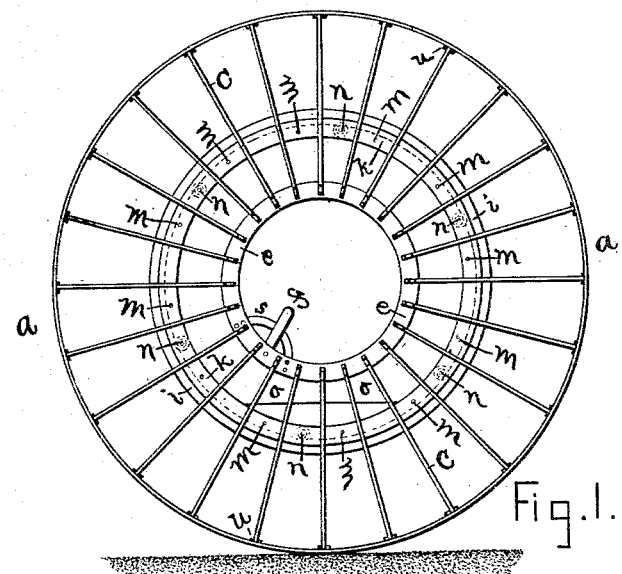
Figure 6:
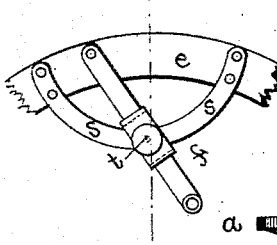
Figure 7:
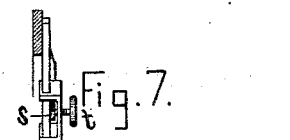
Figure 2:
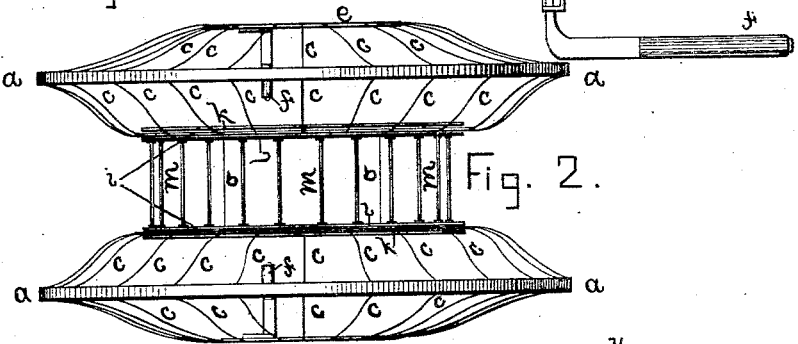
Figure 3:
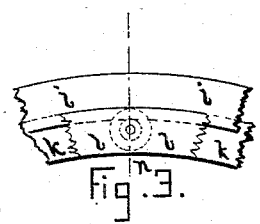
Figure 4:
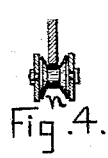
Figure 5:
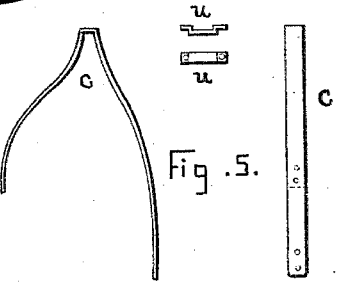

Figure 1 of said drawings is a side elevation of one of said spring-wheels, showing also vertical sections of the connecting-carriage. Fig. 2 is a top perspective view of the vehicle substantially completed. Fig. 3 shows sections of the movable and stationary rings and of the flanged rollers, hereinafter described. Fig. 4 is a perspective view of said flanged roller. Fig. 5 shows detached views of the double curved steel spokes and of the clip or saddle, hereinafter described. Figs. 6 and 7 are views in front and in section of one of the adjustable cranks used for propelling the device.

$a\ a$ are steel rims, from which radiate the double curved steel spokes $c\ c$, as shown in Figs. 1 and 2.

$e\ e$ are crank-rings into which the outer or longer arms of the double curved spokes $c\ c$ are fitted to form the outer side of the wheel, and from the inside of which project the cranks $f\ f$.

$i\ i$ are movable rings, which receive the shorter or inside arms of the said double spokes $c\ c$, and $k\ l$ are stationary rings firmly secured together and holding between them the flanged rolls $n\ n$, into which the movable ring $i$ is fitted, and upon and over which the said movable ring $i$ revolves, as hereinafter described. The stationary rings $k\ l$ are fastened together by means of shoulders and nuts on the ends of the long bolts $m\ m$, the lengthened body of said bolts strongly connecting the two wheels and together forming the outer frame-work of the carriage between said wheels.

$o\ o$ show seat and seat-rests for the rider inside said carriage.

$s$ shows a semicircular attachment upon which the crank $f$ is made adjustable by means of the thumb-screw $t$, as seen in Figs. 6 and 7.

$u\ u$ show the clips or saddles by which the said double curved steel spokes are fitted and fastened to the rim $a$.

The different parts of the device must be made very strong, and very light and durable, and the materials used must be selected with special reference to these ends. The sizes and details of the different parts will be varied as may be required; but I have preferred to make the spring-wheels stand about eight feet high and about three feet apart. The crank-rings $e\ e$ may be about three feet in diameter and three inches wide. The movable rings $i\ i$ may be five feet in diameter and three and one-fourth inches wide. The stationary rings $k\ l$ may be about four feet seven inches in diameter and two and one-half inches wide, holding between them the flanged rollers $n\ n$, of about two inches in length, one and one-fourth inch in diameter, and with side flanges about five-eighths of an inch high. These flanged rollers should turn on steel arbors, provided with oil-chambers, of the usual construction. The said movable ring $i$ is seated within and revolves upon these flanged rollers, as above described. These triple rings—one movable on said rollers and the other two stationary, as aforesaid—form the sides of the carriage for the rider, and the twelve long-shouldered bolts $m\ m$ hold the two sides in their relative positions, about fourteen inches apart, and together form the outer frame-work of said circular carriage. From these stationary rings irons about eighteen inches long may be suspended to hold a floor or rider's foot-rest, and the seat $o$ will be raised about six inches above the lower inner diameter of said rings. Entrance to the carriage will be through the crank-ring $e$, from which there may be suspended a folding step, to aid in entering. The cranks $f\ f$ project inwardly from the crank-rings $e\ e$, and are grasped by the rider, who sits on the seat above described. By them the rider propels the vehicle. To graduate the circle described by the revolving cranks to the comfortable reach of the rider, the position of these cranks relative to the rider is made adjustable on the semicircular attachment *s*, as seen in Figs. 6 and 7. A curved wire frame covered with cloth may be constructed over the carriage as a canopy for the rider. If desired, the details of construction may be so varied as to provide two seats in the carriage, and two riders might sit therein, each facing the other, and both assisting in propelling the device.

The spring-wheels herein described and shown may be used without the intermediate carriage by adapting the double curved springs to an elongated hub fitted to children's carriages and ordinary light vehicles. Wheels so constructed and so applied to common uses would be auxilliary to and might dispense with the springs and thorough braces used to make common carriages ride easily.

What I claim as new, and desire to secure by Letters Patent, is—

1. A vehicle to be propelled by the rider, consisting of two spring-wheels provided with outer crank-rings, *e*, and revolving inner rings, *i*, and connected by an intermediate carriage formed by the stationary rings, rollers, and bolts *k l m n*, all constructed in the manner and used for the purposes substantially as above described and shown.

2. A spring-wheel for vehicles, composed of the steel rim *a*, double curved steel spokes *c c*, and hub formed of rings, as shown, all for the purposes and in the manner substantially as set forth.

3. In vehicles to be propelled by the rider, a circular carriage consisting of the side rings and rollers, *k*, *l*, and *n*, and united by the elongated shouldered bolts *m m*, constructed and used in the manner and for the purposes substantially as described and shown.

4. In vehicles to be propelled by the rider, the combination of the circular carriage formed of the parts *k l m n*, with the spring-wheels formed of the parts *a c e i*, substantially as hereinbefore set forth.

MASON S. PECK.

Witnesses:
THOS. P. BARNEFIELD,
JOSEPH H. PAINE.